United States Patent Office 3,819,753
Patented June 25, 1974

3,819,753
O-VINYL-THIONOPHOSPHORIC(-PHOSPHONIC) ACID ESTERS
Hans-Jochem Riebel, Wuppertal, Dieter Brokmeier, Dormagen, and Ingeborg Hammann, Cologne, Germany, assignors to Bayer Aktiengesellschaft, Leverkusen, Germany
No Drawing. Filed Nov. 2, 1972, Ser. No. 303,303
Claims priority, application Germany, Nov. 13, 1971, P 21 56 446.5
Int. Cl. A01n 9/36; C07f 9/08, 9/36
U.S. Cl. 260—942                                  6 Claims

ABSTRACT OF THE DISCLOSURE

O-vinyl-thionophosphoric(-phosphonic) acid esters of the formula

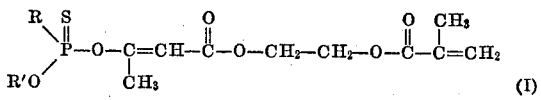

in which

R is an alkyl or alkoxy radical having 1 to 6 carbon atoms or a phenyl radical, and
R' is an alkyl radical having 1 to 6 carbon atoms, which possess insecticidal and acaricidal properties.

---

The present invention relates to and has for its objects the provision of particular new O-vinyl-thionophosphoric (-phosphonic) acid esters, i.e. O,O-dialkyl-O-[1-methacryloxyethoxycarbonylmethylidene)-ethyl] thionophosphoric acid esters and the O-alkyl-alkanethionophosphonic acid ester counterparts thereof, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known that substituted O-vinyl-phosphoric (-phosphonic) acid esters, such as O,O-diethyl-O-(1-phenyl-2-carboethoxyvinyl (Compound A) or —O-(1-methyl-2-chloro-2-carboethoxyvinyl)-phosphoric acid ester (Compound B) and O-ethyl-O-(1-methyl-2-cyano-2-carboethoxyvinyl)-ethanephosphonic acid ester (Compound C) possess insecticidal properties (see Y. Nishizawa, Bull. Agric. Chem. Soc. Japan 25, 61-65 (1961); Belgian Patent Specification 654,748).

The present invent provides, as new compounds, the O-vinylthionophosphoric(-phosphonic) acid esters of the formula

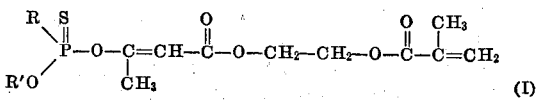

in which

R is an alkyl or alkoxy radcial having 1 to 6 carbon atoms or a phenyl radical, and
R' is an alkyl radical having 1 to 6 carbon atoms.

Surprisingly, the O - vinylthiono - phosphoric( - phosphonic) acid esters of the formula (I) show a considerably higher insecticidal and acaricidal activity than prior art compounds of the same direction of activity. The substances according to the invention therefore represent a genuine enrichment of the art.

Furthermore, they contribute to the reduction of the great requirement for new active compounds in the field of pesticides. This originates in that ever harder demands are being made of the commercially available agents, such as low toxicity to warm-blooded animals, low phytotoxicity, more rapid degradation in and on the plant in short minimum intervals to be observed between spraying with pesticide and harvesting, and effectiveness against resistant pests; these demands, especially in view of questions of environment protection, can lead to the prohibition of certain agents.

Preferably, R in formula (I) is phenyl or a lower alkyl or alkoxy radical having 1 to 4 carbon atoms, and R' is preferably lower alkyl having 1 to 4 carbon atoms.

The general formula (I) includes the corresponding cis- and trans-isomers of the constitution (II) and (III) and the mixtures of these components:

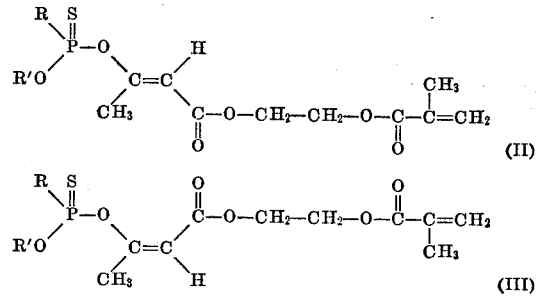

The present invention also provides a process for the preparation of an O-vinylthionophosphoric(-phosphonic) acid ester of the formula (I), in which a thiono-phosphoric(-phosphonic) acid ester monohalide of the general formula

in which

R and R' have the meanings given above, and
Hal denotes a halogen, preferably a chlorine, atom, is reacted with 2-acetoacetoxy-ethyl methacrylate, which has the formula

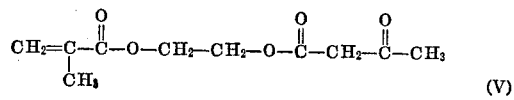

in the presence of an acid-binding agent.

If O-methylthionoethanephosphonic acid ester chloride and 2-acetoacetoxy-ethyl methacrylate are used as starting materials, the reaction course can be represented by the following equation:

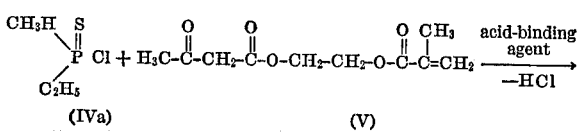

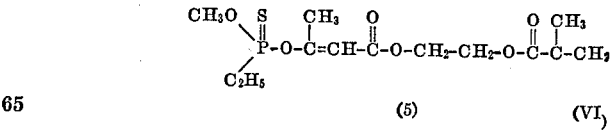

As examples of the thiono-phosphoric(-phosphonic) acid ester monohalides (IV) that can be used, there may be mentioned: O,O-diethyl-, O,O-di-n-propyl-, O,O-diisopropyl-, O,O-di-n-butyl-, O,O-di-isobutyl-, O,O-di-tert.-butyl-, O,O,-di-sec.-butyl and O-methyl-O-isopropyl-thionophosphoric acid ester chlorides; as well as O- methyl-, O-ethyl-, O-n-propyl-, O-isopropyl-, O-n-butyl, O-sec.-butyl-, O-tert.-butyl- and O-iso-butylbenzene- and halogen-, alkyl- and nitro-substituted benzene-thionophosphonic acid ester chlorides and the corrresponding methane-, ethane-, propane- and butane-thionophosphonic acid ester chlorides.

The thiono-phosphoric(-phosphonic) acid ester halides to be used as starting materials have been described in the literature and can be prepared according to customary processes. The likewise known 2-acetoacetoxy-ethyl methacrylate (see British Patent Specification 1,144,486) can be prepared by reacting diketene with methacrylic acid 2-hydroxyethyl ester (D. Borrmann, Houben-Weyl, Methoden der organischen Chemie, Vol. 7/4 (1968), pages 115 to 122).

The process for preparing the new O-vinyl-thionophosphoric(-phosphonic) acid esters (I) is preferably carried out with the use of a suitable solvent or diluent. As such, practically all inert organic solvents are suitable, especially aliphatic and aromatic (possibly chlorinated) hydrocarbons, such as benzene, toluene, xylene, benzine, methylene chloride, chloroform, carbon tetrachloride and chlorobenzene; ethers, such as diethyl ether, dibutyl ether and dioxane; ketones, for example acetone, methyl ethyl ketone, methyl isopropyl ketone and methyl isobutyl ketone; and nitriles, such as acetonitrile and propionitrile.

As the acid-binding agent, any customary acid-acceptors may be used. Particularly good results have been obtained with alkali metal carbonates, such as sodium or potassium carbonate, and aliphatic, aromatic and heterocyclic amines, for example triethylamine, dimethylamine, dimethylaniline, dimethylbenzylamine and pyridine.

The reaction temperatures can be varied within a fairly wide range. In general, the reaction is effected at from about 0° to 100° C., preferably from 15° to 45° C.

The reaction is, in general, carried out at normal pressure.

For the carrying out of the process, the starting materials are generally used in equimolar amounts. An excess of one or other reactant brings no substantial advantages. In most cases, the thiono-phosphoric(-phosphonic) acid ester (IV) is added dropwise to a suspension of 2-acetoacetoxy-ethyl methacrylate (V) in one of the solvents stated, in the presence of the acid acceptor. After several hours' stirring at the aforesaid temperatures, the reaction mixture is filtered and extracted with an organic solvent; the organic phase is separated, washed, dried and the solvent is subsequently drawn off under reduced pressure.

The compounds according to the invention are obtained in most cases in the form of colored oils that cannot be distilled without decomposition but can, by so-called "slight distillation," that is longer heating to moderately elevated temperatures under reduced pressure, be freed from the last volatile components and in this way be purified. For their characterization, the refractive index is especially useful.

As already mentioned, the new O-vinyl-thiono-phosphoric(-phosphonic) acid esters are characterized by an outstanding insecticidal and acaricidal effectiveness against crop pests, pests harmful to health and pests of stored products. They possess a good activity both against sucking and biting insects and mites (Acarina). At the same time they exhibit a low phytotoxicity.

For these reasons, the compounds according to the invention may be used with success as pesticides in crop protection and the protection of stored products, as well as in the hygiene field.

To the sucking insects there belong, in the main, aphids (Aphididae) such as the green peach aphid (Myzus persicae), the bean aphid (Doralis fabae), the bird cherry aphid (Rhopalosiphum padi), the pea aphid (Macrosiphum pisi) and the potato asphid (Macrosiphum solanifolii), the currant gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudoccoccus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus.

In the case of the biting insects, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella).

Also to be classed with the biting insects are beetles (Coleoptera), for example the granary weevil (Sitophilus granarius=Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidius=Acanthoscelides obtectus) the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the saw-toothed grain beetle (Oryzaephilus surinamensis), and also species living in the soil, for example wireworms (Agriotes spec.) and larvae of the cockchafer (Melolontha melolontha); cockroaches, such as the German cockroach (Blattella germanica), American cockroach (Periplaneta americana), Madeira cockroach (Leucophaea or Rhyparobia maderae), oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the eastern subterranean termite (Reticulitermes flavipes) and Hymenoptera such as ants, for example the garden ant (Lasius niger).

The Diptera comprise essentially the flies, such as the vinegar fly (Drosophila melanogaster), the Mediterranean fruit fly (Ceratitis capitata), the house fly (Musca domestica), the little house fly (Fannia canicularis) the black blow fly (Phormia regina) and bluebottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi).

With the mites (Acarina) there are classed, in particular, the spider mites (Tetranychidae) such as the two-spotted spider mite (Tetranychus urticae) and the European red mite (Paraetranychus pilosus=Panonychus ulmi), gall mites, for example the black currant mite (Eriophyes ribis) and tarsonemids, for example the broad mite (Hemitarsonemus latus) and the cyclamen mite (Tarsonemus pallidus); finally, ticks, such as the relapsing fever tick (Ornithodorus moubata).

When applied against pests harmful to health and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticides dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolysis products, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplates those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

*Drosophila* test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

1 ml. of the preparation of the active compound is applied with a pipette to a filter-paper disc of 7 cm. diameter. The wet disc is placed in a glass vessel containing 50 vinegar flies (*Drosophila melanogaster*) and covered with a glass plate.

After the specified period of time, the destruction is determined as a percentage: 100% means that all the flies are killed; 0% means that none of the flies are killed.

The active compounds, their concentrations, the evaluation time and the degree of destruction can be seen from the following Table 1.

TABLE 1

[Drosophila test]

| Active compound | | Concentration of active compound in percent by weight | Degree of destruction in percent after 1 day |
|---|---|---|---|
| $C_2H_5O-CO-CH=C(-C_6H_5)-O-P(=O)(OC_2H_5)_2$ (known) | (A) | 0.1<br>0.01<br>0.001 | 100<br>90<br>10 |
| $C_2H_5O-CO-C(CN)(CH_3)=C-O-P(=O)(OC_2H_5)(C_2H_5)$ (known) | (C) | 0.1<br>0.01<br>0.001 | 100<br>100<br>0 |
| $CH_2=C(CH_3)-C(=O)-O-CH_2-CH_2-O-C(=O)-CH=C(CH_3)-O-P(=S)(OC_2H_5)_2$ | (1) | 0.1<br>0.01<br>0.001<br>0.0001 | 100<br>100<br>100<br>95 |

EXAMPLE 2

Plutella test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified period of time, the degree of destruction is determined as a percentage: 100% means that all the caterpillars are killed whereas 0% means that none of the caterpillars are killed.

The active compounds, the concentrations of the active compounds, the evaluation time and the results can be seen from the following Table 2.

EXAMPLE 3

Myzus test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) that have been heavily infested with peach aphids (*Myzus persicae*) are sprayed with the preparation of the active compound until dripping wet.

After the specified period of time, the degree of destruction is determined as a percentage: 100% means that all the aphids are killed whereas 0% means that none of the aphids are killed.

TABLE 2

[Plutella test]

| Active compound | | Concentration of active compound in percent by weight | Degree of destruction in percent after 3 days |
|---|---|---|---|
| $C_2H_5O-CO-C(Cl)(CH_3)=C-O-P(=O)(OC_2H_5)_2$ (known) | (B) | 0.1<br>0.01 | 100<br>0 |
| $CH_2=C(CH_3)-C(=O)-O-CH_2-CH_2-O-C(=O)-CH=C(CH_3)-O-P(=S)(CH_3)(OC_2H_5)$ | (4) | 0.1<br>0.01 | 100<br>100 |
| $CH_2=C(CH_3)-C(=O)-O-CH_2-CH_2-O-C(=O)-CH=C(CH_3)-O-P(=S)(OC_2H_5)_2$ | (1) | 0.1<br>0.01 | 100<br>100 |
| $CH_2=C(CH_3)-C(=O)-O-CH_2-CH_2-O-C(=O)-CH=C(CH_3)-O-P(=S)(C_2H_5)(OC_2H_5)$ | (2) | 0.1<br>0.01<br>0.001 | 100<br>100<br>50 |

The active compounds, the concentrations of the active compounds, the evaluation time and the results can be seen from the following Table 3.

potassium carbonate and 150 ml. of acetonitrile there are added dropwise, at 20° C., 18.8 g. (0.1 mole) of O,O-diethylthionophosphoric acid ester chloride. The mixture is

TABLE 3
[Myzus test]

| Active compound | | Concentration of active compound in percent by weight | Degree of destruction in percent after 1 day |
|---|---|---|---|
| $C_2H_5O-CO-\underset{CH_3}{\underset{|}{C}}=\underset{}{\overset{CN}{C}}-O-\overset{O}{\underset{}{P}}\overset{OC_2H_5}{\diagdown_{C_2H_5}}$ (known) | (C) | 0.1<br>0.01 | 100<br>0 |
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}\overset{CH_3}{\diagdown_{OC_2H_5}}$ | (4) | 0.1<br>0.01<br>0.001 | 100<br>100<br>80 |
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}(OC_2H_5)_2$ | (1) | 0.1<br>0.01<br>0.001<br>0.0001 | 100<br>100<br>99<br>05 |
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}\overset{C_2H_5}{\diagdown_{OC_2H_5}}$ | (2) | 0.1<br>0.01<br>0.001 | 100<br>100<br>85 |
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}\overset{OC_2H_5}{\diagdown\text{Ph}}$ | (3) | 0.1<br>0.01 | 100<br>90 |

EXAMPLE 4

(a) The 2-acetoacetoxy-ethyl methacrylate of the formula

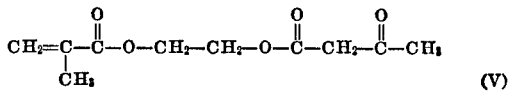

(V)

required as a starting material can be prepared, for example, as follows:

130 g. (1 mole) of methacrylic acid 2-hydroxyethyl ester, 1 g. of pyridine and 1 g. of 2,6-di-tert.-butyl-p cresol are dissolved in 250 ml. of absolute benzene. To this solution there are added dropwise within 30 minutes, with stirring, 88 g. (1.05 moles) of diketene, the temperature rising slowly to the boiling point of the solvent; the mixture is subsequently heated for 2 hours under reflux and the yellow solution is fractionated under reduced pressure. The 2-acetoacetoxy-ethyl methacrylate boils at 100 to 150° C./0.1 mm. Hg and has a refractive index, $n_D^{20}$, of 1.4565.

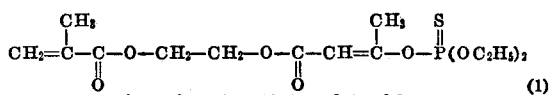

(1)

To a suspension of 21.4 g. (0.1 mole) of 2-acetoacetoxy-ethyl methacrylate, 14.1 g. (0.102 mole) of anhydrous allowed to continue to react at 40° C. for 5 hours; it is then cooled and the reaction mixture is filtered. The filtrate is taken up in 400 ml. of benzene, the benzene solution is washed once with 10 percent strength sodium bicarbonate solution and once with 200 ml. of water and is then dried over sodium sulfate. After the solvent has been drawn off, there are obtained 28 g. (76.5% of theory) of O,O - diethyl-O-[1-(methacryloxyethoxycarbonylmethylidene)-ethyl] thionophosphoric acid ester of the above formula in the form of a red oil with the refractive index $n_D^{23} = 1.4832$.

In an analogous manner, the following compounds can be prepared:

| Constitution | | Physical properties (refractive index) | Yield (percent theory) |
|---|---|---|---|
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}\overset{C_2H_5}{\diagdown_{OC_2H_5}}$ | (2) | $n_D^{23}=1.4954$ | 70 |
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}\overset{OC_2H_5}{\diagdown\text{Ph}}$ | (3) | $n_D^{28}=1.5280$, orange-colored oil. | 87 |
| $CH_2=\underset{O}{\overset{CH_3}{\underset{\|}{C}}}-\underset{\|}{\overset{}{C}}-O-CH_2-CH_2-O-\underset{O}{\overset{}{\underset{\|}{C}}}-CH=\underset{CH_3}{\overset{}{C}}-O-\overset{S}{\underset{}{P}}\overset{CH_3}{\diagdown_{OC_2H_5}}$ | (4) | $n_D^{24}=1.4852$, red oil. | 80 |

It will be appreciated that the instant specification and examples are set forth by way of illustration and not limitation, and that various modifications and changes may be made without departing from the spirit and scope of the present invention.

What is claimed is:

1. An O-vinylthiono-phosphoric(-phosphonic) acid ester of the formula

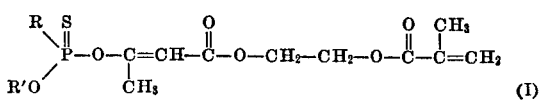

(I)

in which

R is an alkyl or alkoxy radical having 1 to 6 carbon atoms or a phenyl radical, and R' is an alkyl radical having 1 to 6 carbon atoms.

2. A compound according to claim 1, in which R is an alkyl or alkoxy radical having 1 to 4 carbon atoms or a phenyl radical and R' is an alkyl radical having 1 to 4 carbon atoms.

3. The compound according to claim 1 wherein such compound is

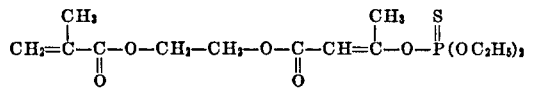

(1)

4. The compound according to claim 1 wherein such compound is

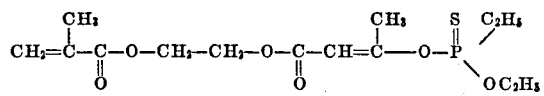

(2)

5. The compound according to claim 1 wherein such compound is

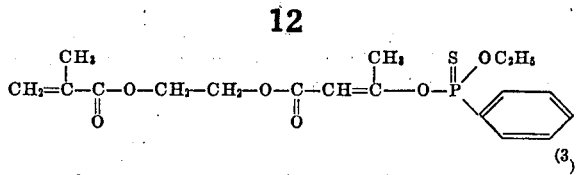

(3)

6. The compound according to claim 1 wherein such compound is

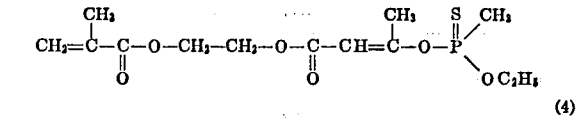

(4)

References Cited

UNITED STATES PATENTS 3,077,431  2/1963  Baker et al. _____ 260—972 X
3,053,729  9/1962  Sun _____ 260—942 UX ANTON H. SUTTO, Primary Examiner U.S. Cl. X.R.

424—212